(12) United States Patent
Botea et al.

(10) Patent No.: US 11,275,889 B2
(45) Date of Patent: Mar. 15, 2022

(54) ARTIFICIAL INTELLIGENCE FOR INTERACTIVE PREPARATION OF ELECTRONIC DOCUMENTS

(71) Applicant: International Business Machines Corporation, Armonk, NY (US)

(72) Inventors: Adi I. Botea, Dublin (IE); Akihiro Kishimoto, Castleknock (IE); Beat Buesser, Ashtown (IE); Bei Chen, Blanchardstown (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

(21) Appl. No.: 16/375,077

(22) Filed: Apr. 4, 2019

(65) Prior Publication Data
US 2020/0320164 A1    Oct. 8, 2020

(51) Int. Cl.
*G06F 40/166*    (2020.01)
*G10L 15/22*    (2006.01)
*G06F 3/01*    (2006.01)
*G06N 20/00*    (2019.01)

(52) U.S. Cl.
CPC ............ *G06F 40/166* (2020.01); *G06F 3/017* (2013.01); *G06N 20/00* (2019.01); *G10L 15/22* (2013.01); *G10L 2015/223* (2013.01)

(58) Field of Classification Search
CPC .................................................. G06F 40/166
See application file for complete search history.

(56) References Cited

U.S. PATENT DOCUMENTS

| | | | |
|---|---|---|---|
| 8,065,143 B2 | 11/2011 | Yanagihara | |
| 8,670,018 B2 | 3/2014 | Cunnington et al. | |
| 9,601,117 B1* | 3/2017 | Pettay et al. | ............ G10L 15/32 |
| 9,640,181 B2 | 5/2017 | Parkinson et al. | |
| 9,870,362 B2 | 1/2018 | Lee et al. | |
| 10,033,774 B2 | 7/2018 | Kotler et al. | |
| 10,534,525 B1* | 1/2020 | Suchland | .............. G06F 3/0487 |
| 2007/0061384 A1* | 3/2007 | Harrington et al. | .... G06F 17/30 |
| 2009/0319267 A1* | 12/2009 | Kurki-Suonio | ......... G10L 15/26 |
| 2013/0298029 A1 | 11/2013 | Natori et al. | |
| 2014/0019881 A1* | 1/2014 | Narita et al. | .......... H04L 65/403 |
| 2014/0198129 A1* | 7/2014 | Liu et al. | .................. G06F 3/01 |
| 2014/0372370 A1* | 12/2014 | Massand | ........... G06F 17/30011 |
| 2015/0026569 A1 | 1/2015 | Lee et al. | |

(Continued)

OTHER PUBLICATIONS

Dictate.MS, "Hands free typing in Microsoft Office!," https://dictate.ms/, Copyright © 2017 Microsoft Corporation, 1 page.

(Continued)

*Primary Examiner* — James J Debrow
(74) *Attorney, Agent, or Firm* — Amin, Turocy & Watson, LLP

(57) ABSTRACT

Techniques and systems for facilitating artificial intelligence for interactive preparation of electronic documents are provided. In one example, a system includes a mapping component and a document editing component. The mapping component maps data provided by a recording device into an editing action for an electronic document. The document editing component applies the editing action associated with the recording device to the electronic document to generate a modified version of the electronic document.

20 Claims, 12 Drawing Sheets

(56) References Cited

U.S. PATENT DOCUMENTS

| | | |
|---|---|---|
| 2015/0138073 A1 | 5/2015 | Hennelly |
| 2015/0187355 A1* | 7/2015 | Parkinson et al. ...... G10L 15/26 |
| 2016/0239202 A1* | 8/2016 | Lee et al. .............. G06F 3/0488 |
| 2018/0336891 A1* | 11/2018 | Sun et al. ................ G06F 17/28 |
| 2018/0357562 A1* | 12/2018 | Hofman ............... G06N 99/005 |
| 2019/0236562 A1* | 8/2019 | Padmanabhan .... G06Q 20/0655 |
| 2020/0320164 A1* | 10/2020 | Botea et al. ............ G06F 17/24 |

OTHER PUBLICATIONS

Mel, et al., "The NIST Definition of Cloud Computing," Special Publication 800-145, Sep. 2011, 7 pages.

Toshev, et al., "DeepPose: Human Pose Estimation via Deep Neural Networks," arXiv:1312.4659v3 [cs.CV] Aug. 20, 2014, https://arxiv.org/abs/1312.4659, 9 pages.

WWW.IBM.COM, "Watson Assistant," https://www.IBM.com/cloud/watson-assistant/, Retrieved: Apr. 4, 2019, 5 pages.

\* cited by examiner

ARTIFICIAL INTELLIGENCE FOR INTERACTIVE PREPARATION OF ELECTRONIC DOCUMENTS

BACKGROUND

The subject disclosure relates to network-connected devices and more specifically, to artificial intelligence for preparation of electronic documents via network-connected devices.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products for facilitating artificial intelligence for interactive preparation of electronic documents are described.

According to an embodiment, a system can comprise a mapping component and a document editing component. The mapping component can map data provided by a recording device into an editing action for an electronic document. The document editing component can apply the editing action associated with the recording device to the electronic document to generate a modified version of the electronic document.

According to another embodiment, a computer-implemented method is provided. The computer-implemented method can comprise mapping, by a system operatively coupled to a processor, data provided by a recording device into an editing action for an electronic document. The computer-implemented method can also comprise generating, by the system, a modified version of the electronic document by applying the editing action associated with the recording device to the electronic document.

According to yet another embodiment, a computer program product for facilitating electronic document preparation can comprise a computer readable storage medium having program instructions embodied therewith. The program instructions can be executable by a processor and cause the processor to map, by the processor, data provided by a recording device into an editing action for an electronic document. The program instructions can also cause the processor to apply, by the processor, the editing action associated with the recording device to the electronic document to generate a modified version of the electronic document. Furthermore, the program instructions can cause the processor to display, by the processor, the modified version of the electronic document via a display device.

DETAILED DESCRIPTION

Figure 1:
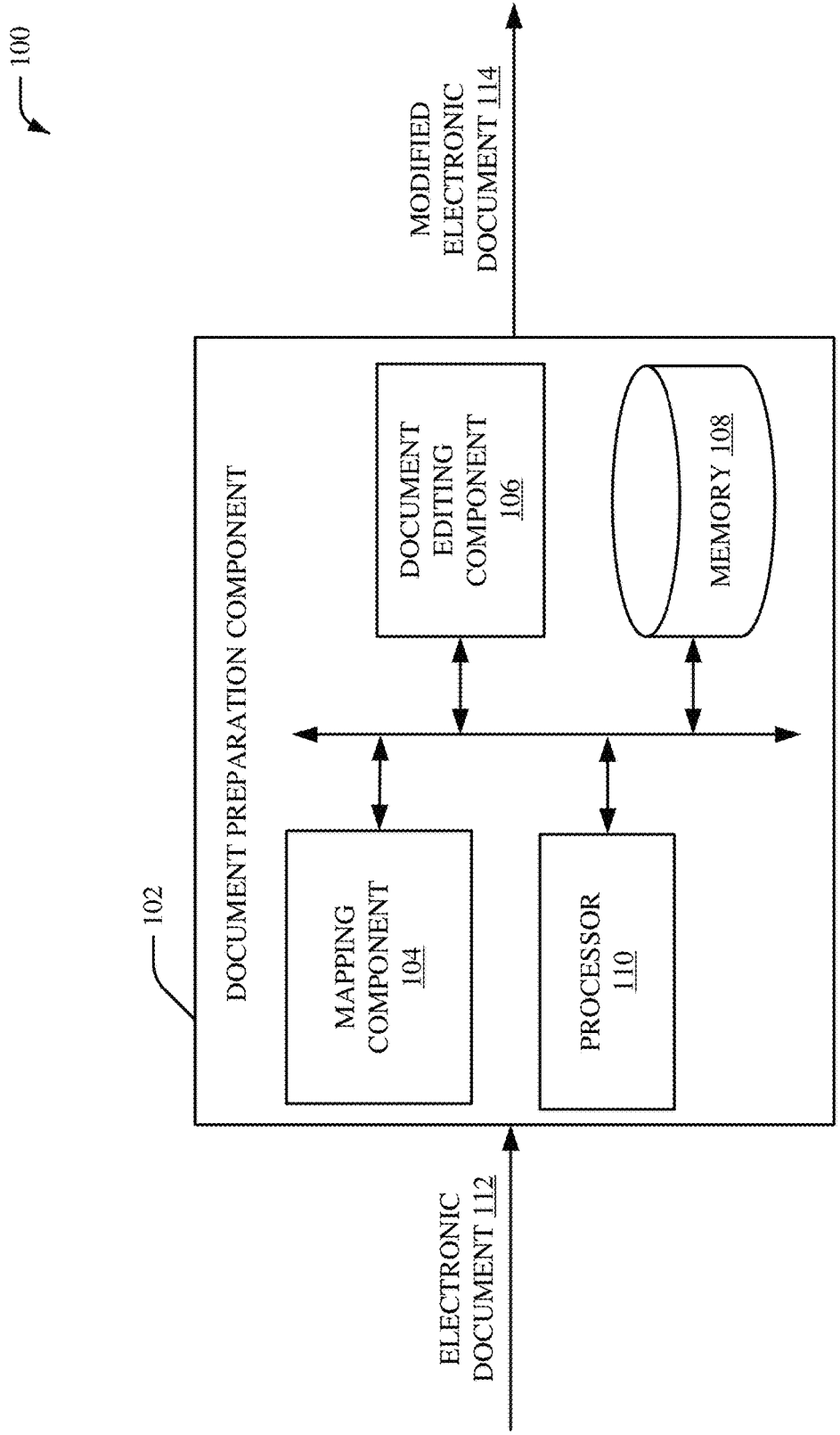
FIG. 1 illustrates a block diagram of an example, non-limiting system that includes a document preparation component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Preparation of electronic documents (e.g., presentation slides, text and/or graphical reports, etc.) often involves real-time collaboration of multiple users. In certain implementations, real-time collaboration associated with preparation of electronic documents can be realized via a cloud computing environment. For example, a first user can provide comments on content in an electronic document associated with a cloud computing environment while a second user can be applying changes to the electronic document. However, the second user may misinterpret the comments provided by the first user, the second user may apply a change to the electronic document without knowledge of a comment by the first user, etc. As such, preparation of electronic documents is often inefficient and/or error-prone.

To address these and/or other issues, embodiments described herein include systems, computer-implemented methods, and computer program products to provide artificial intelligence for interactive preparation of electronic documents. In an aspect, one or more artificial intelligence techniques can be employed to automatically convert comments from one or more users into an electronic document approximately in real-time. Additionally or alternatively, one or more artificial intelligence techniques can be employed to manage two or more different versions of an electronic document during interactive preparation of the electronic document. Additionally or alternatively, one or more artificial intelligence techniques can be employed to recommend an optimal version of the electronic document from the two or more different versions of the electronic document. In an embodiment, a device can manage data representing an electronic document. Furthermore, one or more cameras and/or one or more microphones can be employed to capture gestures and/or voice input. A gesture can be, for example, a pointing action to a displayed version of the electronic document displayed on a display device. Collected data associated with the captured gestures and/or the voice input can be analyzed to map the collected data into one or more actions for the electronic document. The one or more actions can be one or more actions to edit the electronic document. For instance, the one or more actions can include one or more actions to edit text, a chart, an image, a link, a table, an animation, a video and/or other content in the electronic document. In an example, the one or more actions can include one or more actions to add, modify, format, translate, remove, insert and/or move content associated with the electronic document. Additionally or alternatively, the one or more actions can be one or more actions to navigate through the electronic document. In an example, a microphone can be employed to recognize a command from a user physically located behind a camera. One or more artificial intelligence techniques can be employed, for example, to recognize the one or more actions for the electronic document. In certain embodiments, the electronic document can be displayed on a display device. For example, the electronic document can be displayed on a screen. In another example, the electronic document can be displayed on a projector wall. In another embodiment, a database can store data for one or more gestures and/or one or more key phrases along with a corresponding editing action for the one or more gestures and/or the one or more key phrases. In certain embodiments, the one or more cameras and/or the one or more microphones can be calibrated and/or initialized to facilitate capturing gestures and/or voice input. As such, efficiency to prepare an electronic document can be improved. Furthermore, error associated with preparation of an electronic document can be reduced. Therefore, an improved electronic document can be provided. An improved electronic document preparation process and/or increased efficiency for preparing an electronic document can be provided. Moreover, performance of a network environment and/or an artificial intelligence process associated with electronic document preparation can be improved.

FIG. 1 illustrates a block diagram of an example, non-limiting system 100 that provides artificial intelligence for interactive preparation of electronic documents in accordance with one or more embodiments described herein. In various embodiments, the system 100 can be a system associated with technologies such as, but not limited to, electronic document technologies, artificial intelligence technologies, machine learning technologies, network-connected device technologies, internet of things (IoT) technologies, internet technology software technologies, client software technologies, office suite software technologies, network technologies, cloud computing technologies, network platform technologies, consumer device technologies, recording device technologies, microphone technologies, camera technologies, speech recognition technologies, gesture analysis technologies, gesture recognition technologies, enterprise technologies, and/or other technologies. The system 100 can employ hardware or software to solve problems that are highly technical in nature, that are not abstract and that cannot be performed as a set of mental acts by a human. Further, in certain embodiments, some of the processes performed may be performed by one or more specialized computers (e.g., one or more specialized processing units, a specialized computer with a document preparation component, etc.) for carrying out defined tasks related to artificial intelligence for interactive preparation of electronic documents. The system 100 or components of the system 100 can be employed to solve new problems that arise through advancements in technologies mentioned above, computer architecture, network architecture, and/or the like. One or more embodiments of the system 100 can provide technical improvements to electronic document systems, artificial intelligence systems, machine learning systems, network-connected device systems, IoT systems, internet technology software systems, client software systems, office suite software systems, network systems, cloud computing systems, network platform systems, consumer device systems, recording device systems, microphone systems, camera systems, speech recognition systems, gesture analysis systems, gesture recognition systems, enterprise systems, and/or other systems. One or more embodiments of the system 100 can also provide technical improvements to a processor associated with an electronic document by improving processing performance of the processor, improving processing efficiency of the processor, improving processing characteristics of the processor, improving timing characteristics of the processor, and/or improving power efficiency of the processor.

In the embodiment shown in FIG. 1, the system 100 can include a document preparation component 102. As shown in FIG. 1, the document preparation component 102 can include a mapping component 104 and/or a document editing component 106. Aspects of the document preparation component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the document preparation component 102 can also include memory 108 that stores computer executable components and instructions. Furthermore, the document preparation component 102 can include a processor 110 to facilitate execution of the instructions (e.g., computer executable components and corresponding instructions) by the document preparation component 102. As shown, the mapping component 104, the document editing component 106, the memory 108 and/or the processor 110 can be electrically or communicatively coupled to one another in one or more embodiments.

The document preparation component 102 (e.g., the mapping component 104 of the document preparation component 102) can receive an electronic document 112. In certain embodiments, the document preparation component 102 (e.g., the document editing component 106 of the document preparation component 102) can generate at least a portion of the electronic document 112. The electronic document 112 can be a digital document that is generated and/or managed by a computer (e.g., a computing device). The electronic document 112 can include electronic content such as electronic textual content, electronic media content, graphical content and/or other content. For example, the electronic document 112 can include text, one or more charts, one or more images, one or more links, one or more tables, one or more animations, one or more videos and/or other content.

The mapping component can map data provided by one or more recording devices into one or more actions for the electronic document 112. The one or more recording devices can include one or more microphones, one or more cameras, one or more sensors, and/or one or more other recording devices. For example, a microphone included in the one or more recording devices can capture and/or record audio data. In another example, a camera from the one or more recording devices can capture and/or record image data and/or video data. In yet another example, a sensor from the one or more recording devices can capture and/or record sensor data associated with audio data, image data, video data, and/or other data. The one or more actions can be one or more editing actions for the electronic document 112 and/or one or more navigation actions for the electronic document 112. An editing action can be, for example, an action to add content to the electronic document 112, an action to modify content in the electronic document 112, an action to format content in the electronic document 112, an action to remove content from the electronic document 112, an action to insert content to the electronic document 112, an action to move content in the electronic document 112, and/or another type of action to edit the electronic document 112. A navigation action can be, for example, an action to modify (e.g., alter) a view of the electronic document 112, an action to change a viewing location within the electronic document 112, and/or another type of action to navigate within the electronic document 112.

In an embodiment, the mapping component 104 can map data provided by one or more recording devices into one or more actions for the electronic document 112 based on action data stored in a database. For example, the action data can include data for a set of gestures and a corresponding action for one or more gestures included in the set of gestures. Additionally or alternatively, the action data can include data for a set of phrases and a corresponding action for one or more phrases included in the set of phrases. The action data can include a set of actions associated with the set of gestures and/or the set of phrases. For instance, the action data can include a set of editing actions associated with the set of gestures and/or the set of phrases. The action data can additionally or alternatively include a set of navigation actions associated with the set of gestures and/or the set of phrases. In an aspect, the mapping component 104 can compare data provided by one or more recording devices to the set of actions included in the action data. For example, the mapping component 104 can compare data provided by one or more recording devices to the set of editing actions and/or the set of navigation actions included in the action data. The mapping component 104 can also select an action from the set of actions for the electronic document 112. For example, the mapping component 104 can also select an editing action from the set of editing actions and/or a navigation action from the set of navigation actions for the electronic document 112. In another embodiment, the mapping component 104 can map data provided by one or more recording devices into one or more actions for the electronic document 112 based on one or more speech recognition techniques. For example, the mapping component 104 can map audio data provided by one or more recording devices into one or more actions for the electronic document 112 based on one or more speech recognition processes that interpret the audio data. Additionally or alternatively, the mapping component 104 can map data provided by one or more recording devices into one or more actions for the electronic document 112 based on one or more gesture recognition techniques. For example, the mapping component 104 can map image data and/or video data provided by one or more recording devices into one or more actions for the electronic document 112 based on one or more gesture recognition processes that interpret the image data and/or the video data.

In yet another embodiment, the mapping component 104 can additionally or alternatively map data provided by one or more recording devices into one or more actions for the electronic document 112 based on one or more artificial intelligence techniques. For instance, the mapping component 104 can analyze data provided by one or more recording devices based on one or more artificial intelligence techniques. The mapping component 104 can map data provided by one or more recording devices into one or more actions for the electronic document 112 based on classifications, correlations, inferences or expressions associated with principles of artificial intelligence (e.g., the one or more artificial intelligence techniques). In an aspect, the mapping component 104 can employ an automatic classification system or an automatic classification process to map data provided by one or more recording devices into one or more actions for the electronic document 112. In one example, the mapping component 104 can employ a probabilistic or statistical-based analysis to learn or generate inferences with respect to data provided by one or more recording devices. In another aspect, the mapping component 104 can include an inference component (not shown) that can further enhance aspects of the mapping component 104 utilizing in part inference-based schemes to facilitate mapping data provided by one or more recording devices into one or more actions for the electronic document 112. The mapping component 104 can employ any suitable machine-learning based techniques, statistical-based techniques and/or probabilistic-based techniques. For example, the mapping component 104 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the mapping component 104 can perform a set of machine learning computations associated with analysis of data provided by one or more recording devices. For example, the mapping component 104 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, or a set of different machine learning computations associated with mapping data provided by one or more recording devices into one or more actions for the electronic document 112.

The document editing component 106 can apply one or more actions associated with the one or more recording devices to the electronic document 112 to generate a modified electronic document 114. The modified electronic document 114 can be a modified version of the electronic document 112. For instance, in response to the one or more actions being applied to the electronic document 112, the electronic document 112 can be transformed into the modified electronic document 114. In an aspect, the document editing component 106 can apply one or more editing actions associated with the one or more recording devices to the electronic document 112 to generate the modified electronic document 114. Additionally or alternatively, the document editing component 106 can apply one or more navigation actions associated with the one or more recording devices to the electronic document 112 to generate the modified electronic document 114.

In certain embodiments, the mapping component 104 can map first data provided by a first recording device into a first action (e.g., a first editing action or a first navigation action) for the electronic document 112. Furthermore, the mapping component 104 can map second data provided by a second recording device into a second action (e.g., a second editing action or a second navigation action) for the electronic document 112. The document editing component 106 can determine whether to apply the first action or the second action to the electronic document 112. For instance, the document editing component 106 can determine whether to apply the first action or the second action to the electronic document 112 to generate the modified electronic document 114. In an aspect, the document editing component 106 can apply the first action to the electronic document 112 to generate a first version of the modified electronic document 114. The document editing component 106 can also apply the second action to the electronic document 112 to generate a second version of the modified electronic document 114. Furthermore, the document editing component 106 can select the first version of the modified electronic document 114 or the second version of the modified electronic document 114 as an optimal version of the modified electronic document 114.

In certain embodiments, the document editing component 106 can determine whether to apply the first action or the second action to the electronic document 112 based on one or more artificial intelligence techniques. For example, the document editing component 106 can select the first version of the modified electronic document 114 or the second version of the modified electronic document 114 as an optimal version of the modified electronic document 114 based on one or more artificial intelligence techniques. The document editing component 106 can determine whether to apply the first action or the second action to the electronic document 112 based on classifications, correlations, inferences or expressions associated with principles of artificial intelligence (e.g., the one or more artificial intelligence techniques). In an aspect, the document editing component 106 can employ an automatic classification system or an automatic classification process to determine whether to apply the first action or the second action to the electronic document 112. In one example, the document editing component 106 can employ a probabilistic or statistical-based analysis to learn or generate inferences with respect to the first action or the second action. In another aspect, the document editing component 106 can include an inference component (not shown) that can further enhance aspects of the mapping component 104 utilizing in part inference-based schemes to facilitate determining whether to apply the first action or the second action to the electronic document 112. The mapping component 104 can employ any suitable machine-learning based techniques, statistical-based techniques and/or probabilistic-based techniques. For example, the document editing component 106 can employ expert systems, fuzzy logic, SVMs, HMMs, greedy search algorithms, rule-based systems, Bayesian models (e.g., Bayesian networks), neural networks, other non-linear training techniques, data fusion, utility-based analytical systems, systems employing Bayesian models, etc. In another aspect, the document editing component 106 can perform a set of machine learning computations to determine whether to apply the first action or the second action to the electronic document 112. For example, the document editing component 106 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, or a set of different machine learning computations associated with determining whether to apply the first action or the second action to the electronic document 112.

It is to be appreciated that the document preparation component 102 (e.g., the mapping component 104 and/or the document editing component 106) performs a document preparation process associated with artificial intelligence that cannot be performed by a human (e.g., is greater than the capability of a single human mind). For example, an amount of data processed, a speed of data processed or data types of data processed by the document preparation component 102 (e.g., the mapping component 104 and/or the document editing component 106) over a certain period of time can be greater, faster and different than an amount, speed and data type that can be processed by a single human mind over the same period of time. The document preparation component 102 (e.g., the mapping component 104 and/or the document editing component 106) can also be fully operational towards performing one or more other functions (e.g., fully powered on, fully executed, etc.) while also performing the above-referenced document preparation process associated with artificial intelligence. Moreover, the modified electronic document 114 generated by the document preparation component 102 (e.g., the mapping component 104 and/or the document editing component 106) can include information that is impossible to obtain manually by a user. For example, a type of information included in the modified electronic document 114, or a variety of information included in the modified electronic document 114 can be more complex than information obtained manually by a user.

Figure 2:
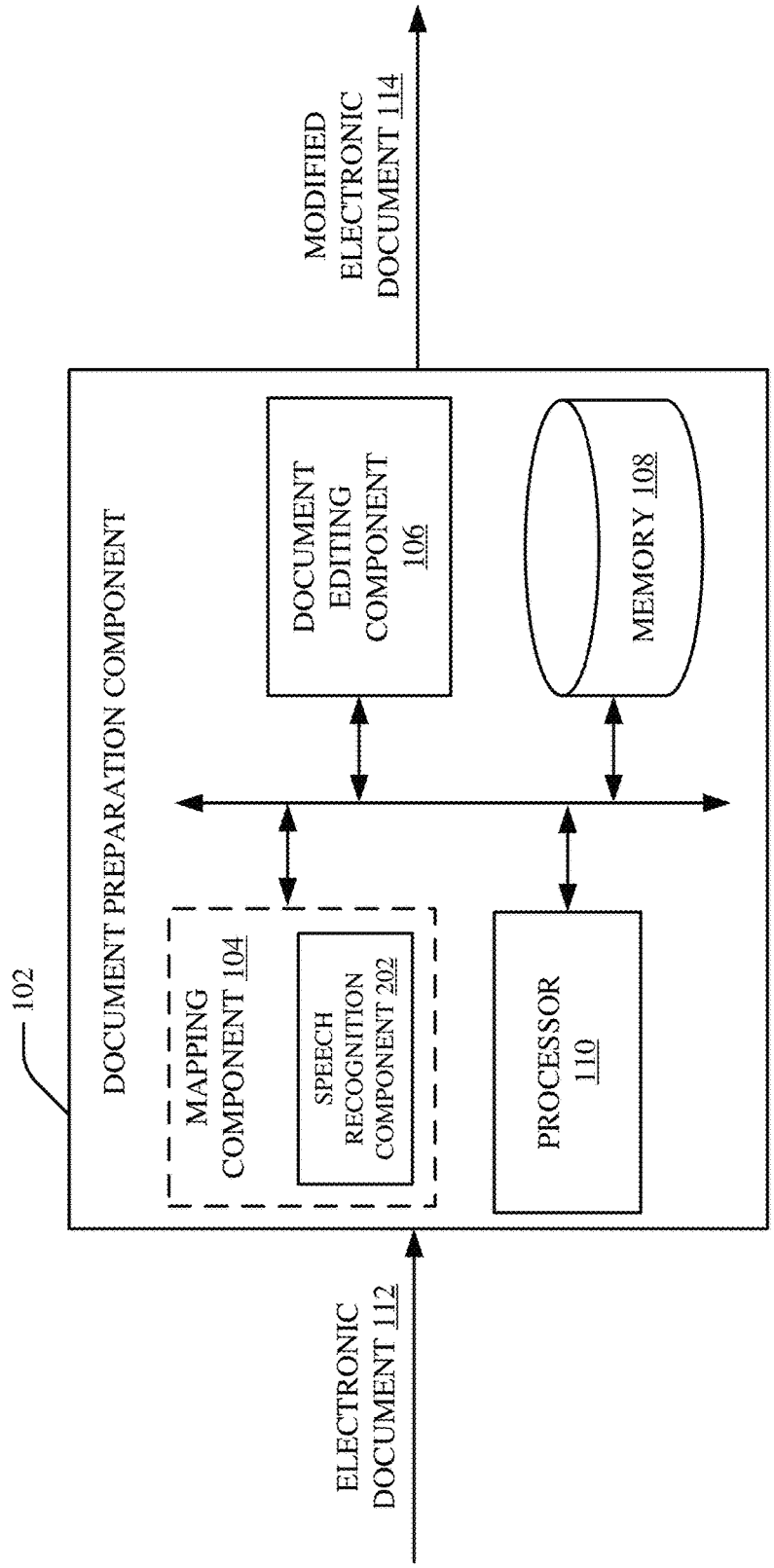
FIG. 2 illustrates a block diagram of another example, non-limiting system that includes a document preparation component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the document preparation component 102. The document preparation component 102 can include the mapping component 104, the document editing component 106, the memory 108, and/or the processor 110. In the embodiment shown in FIG. 2, the mapping component 104 can include a speech recognition component 202. The speech recognition component 202 can extract one or more editing instructions and/or one or more navigation instructions verbally provided via one or more recording devices. For example, the speech recognition component 202 can extract one or more voice actions verbally provided via one or more recording devices. In an aspect, the speech recognition component 202 can perform a speech recognition process to map data provided by one or more recording devices into one or more actions (e.g., one or more editing actions and/or one or more navigation actions) for the electronic document 112. For instance, the speech recognition component 202 can employ one or more speech recognition techniques to map data provided by one or more recording devices into one or more actions (e.g., one or more editing actions and/or one or more navigation actions) for the electronic document 112. In an embodiment, the speech recognition process can be associated with natural language processing. In an aspect, the speech recognition component 202 can perform the speech recognition process to map audio data, video data, sensor data and/or other data provided by one or more recording devices into one or more actions (e.g., one or more editing actions and/or one or more navigation actions) for the electronic document 112. For example, the speech recognition component 202 can receive audio data from a microphone device and can perform the speech recognition process to map the audio data into one or more actions (e.g., one or more editing actions and/or one or more navigation actions) for the electronic document 112. In another example, the speech recognition component 202 can receive audio data and/or video data from a camera device and can perform the speech recognition process to map the audio data and/or the video data into one or more actions (e.g., one or more editing actions and/or one or more navigation actions) for the electronic document 112. In an embodiment, the speech recognition component 202 can interpret, using one or more speech recognition techniques, data provided by one or more recording devices and can compare the interpreted data to a set of phrases included in action data. In an non-limiting example, the speech recognition component 202 can receive audio data from a recording device and can analyze the audio data to extract a command such as, for example, "Highlight <text> in <visual indicator>" as a template for "Highlight "selected text" in a particular visual indicator."

Figure 3:
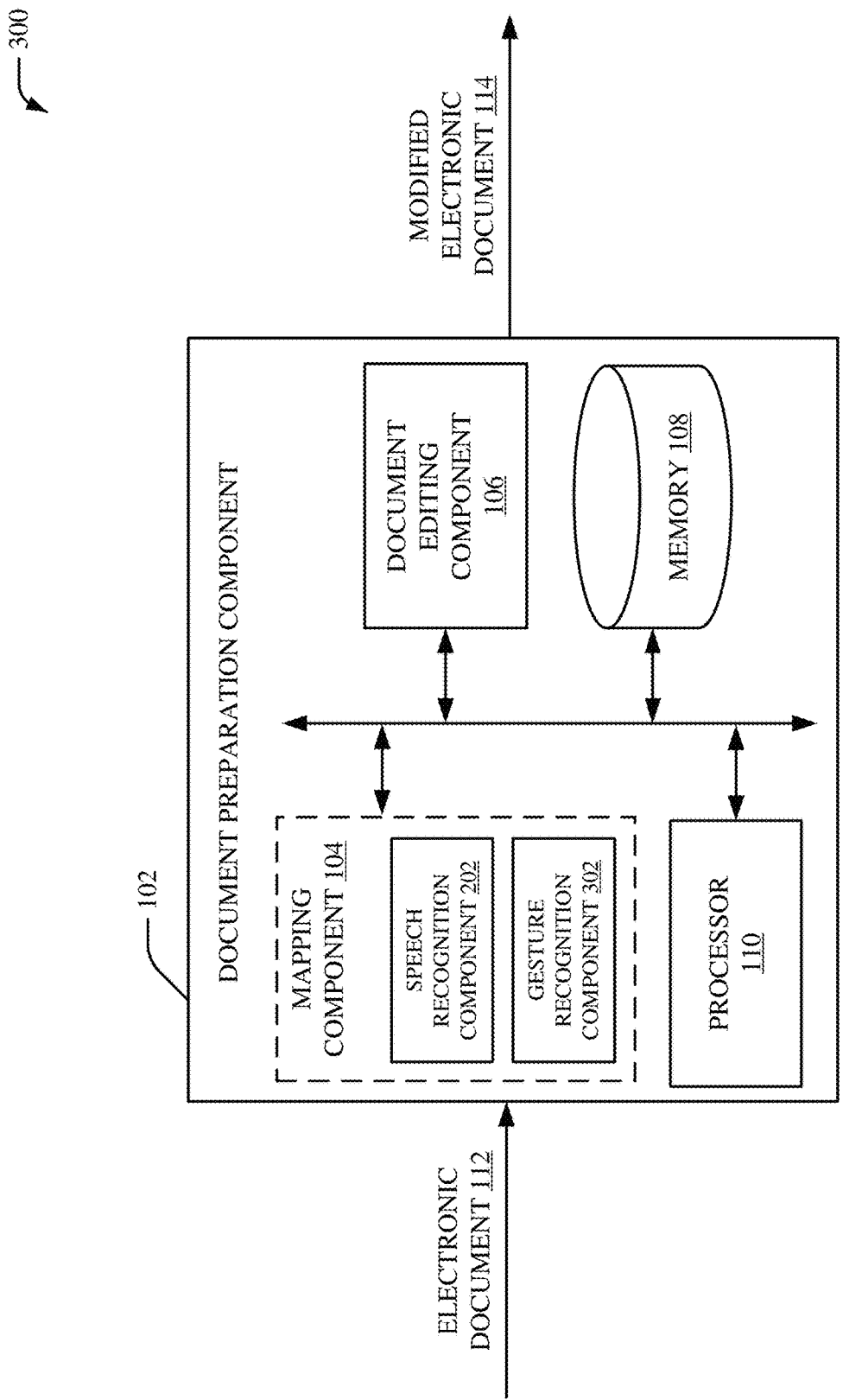
FIG. 3 illustrates a block diagram of yet another example, non-limiting system that includes a document preparation component in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the document preparation component 102. The document preparation component 102 can include the mapping component 104, the document editing component 106, the memory 108, and/or the processor 110. In the embodiment shown in FIG. 3, the mapping component 104 can include the speech recognition component 202 and/or a gesture recognition component 302. The gesture recognition component 302 can predict non-verbal gestures associated with data provided via one or more recording devices. For instance, the gesture recognition component 302 can predict one or more gesture actions associated with data provided via one or more recording devices. In an example, the gesture recognition component 302 can estimate a location where a user is pointing with respect to the electronic document 112 displayed via a display device. In another example, the gesture recognition component 302 can recognize a specific non-verbal gesture for a specific editing action. In an aspect, the gesture recognition component 302 can perform a gesture recognition process (e.g., a gesture analysis process) to map data provided by one or more recording devices into one or more actions (e.g., one or more editing actions and/or one or more navigation actions) for the electronic document 112. For instance, the gesture recognition component 302 can employ one or more gesture recognition techniques (e.g., one or more gesture analysis techniques) to map data provided by one or more recording devices into one or more actions (e.g., one or more editing actions and/or one or more navigation actions) for the electronic document 112. In an aspect, the gesture recognition component 302 can perform the gesture recognition process to map image data, video data, sensor data and/or other data provided by one or more recording devices into one or more actions (e.g., one or more editing actions and/or one or more navigation actions) for the electronic document 112. For example, the gesture recognition component 302 can receive image data and/or video data from a camera device and can perform the gesture recognition process to map the image data and/or the video into one or more actions (e.g., one or more editing actions and/or one or more navigation actions) for the electronic document 112. In an embodiment, the gesture recognition component 302 can interpret, using one or more gesture recognition techniques, data provided by one or more recording devices and can compare the interpreted data to information associated with a set of gestures included in action data. In another embodiment, the gesture recognition component 302 can interpret a gesture action associated with a visual representation of the electronic document 112 on a display device that includes a display. For instance, the gesture recognition component 302 can interpret a non-verbal gesture of a user physically located next to the display device. An action associated with a non-verbal gesture can be, for example, cut, move, copy, insert, format, undo and/or another type of action associated with the electronic document 112. The display device can be a screen, a monitor, a projector wall, or another display device associated with a display configured to present the electronic document 112.

Figure 4:
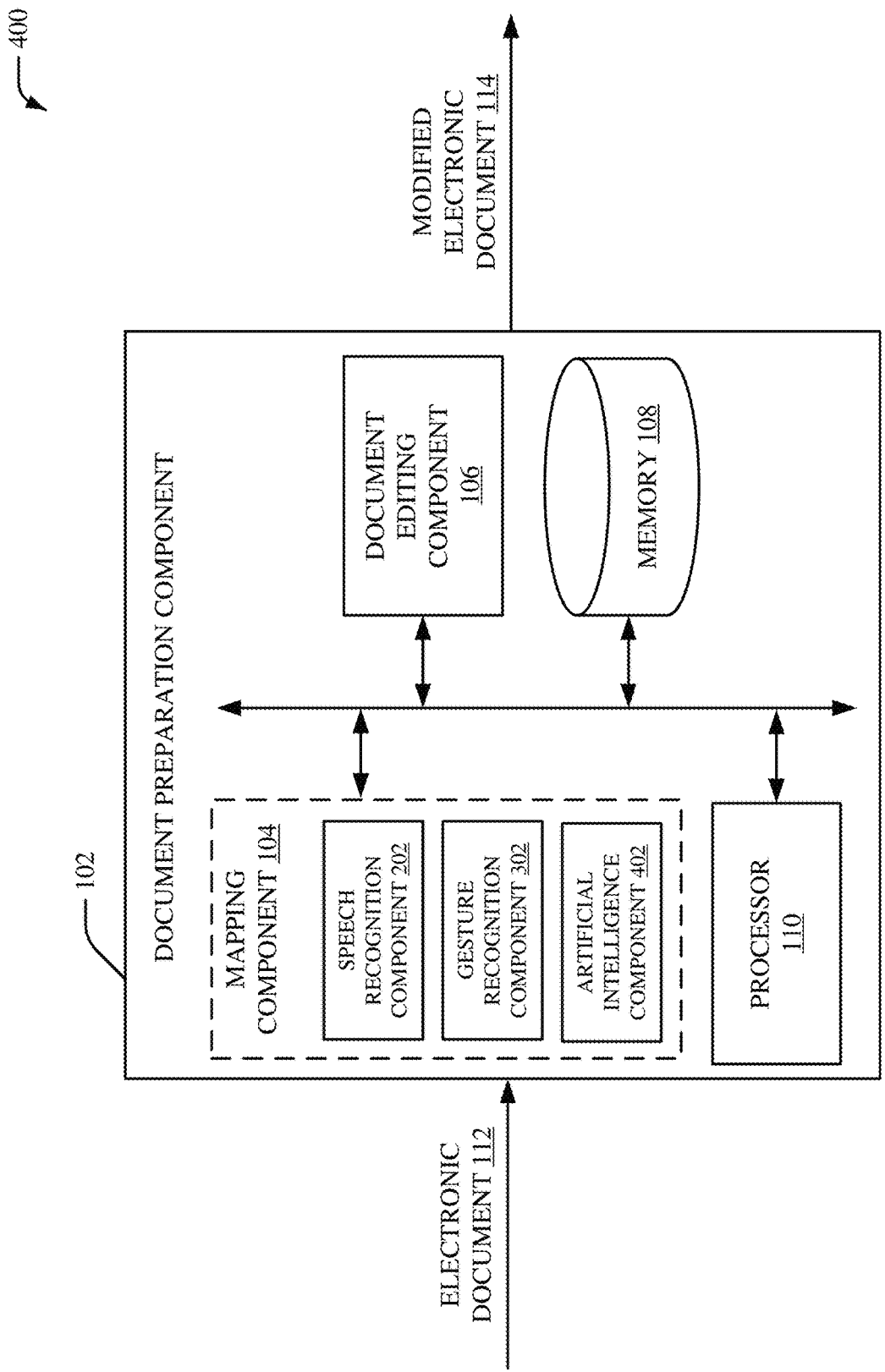
FIG. 4 illustrates a block diagram of yet another example, non-limiting system that includes a document preparation component in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes the document preparation component 102. The document preparation component 102 can include the mapping component 104, the document editing component 106, the memory 108, and/or the processor 110. In the embodiment shown in FIG. 4, the mapping component 104 can include the speech recognition component 202, the gesture recognition component 302 and/or an artificial intelligence component 402. In an embodiment, the artificial intelligence component 402 can map data provided by one or more recording devices into one or more actions for the electronic document 112 based on one or more artificial intelligence techniques. For instance, the artificial intelligence component 402 can analyze data provided by one or more recording devices based on one or more artificial intelligence techniques. In certain embodiments, the artificial intelligence component 402 can map audio data, image data, video data, sensor data and/or other data provided by one or more recording devices into one or more actions for the electronic document 112 based on one or more speech recognitions techniques associated with artificial intelligence and/or one or more gesture recognitions techniques associated with artificial intelligence. The artificial intelligence component 402 can map data provided by one or more recording devices into one or more actions for the electronic document 112 based on classifications, correlations, inferences or expressions associated with principles of artificial intelligence (e.g., the one or more artificial intelligence techniques). For example, the artificial intelligence component 402 can map audio data, image data, video data, sensor data and/or other data provided by one or more recording devices into one or more actions for the electronic document 112 based on classifications, correlations, inferences or expressions associated with principles of artificial intelligence for one or more speech recognitions and/or one or more gesture recognitions techniques. In an aspect, the artificial intelligence component 402 can employ an automatic classification system or an automatic classification process to map audio data, image data, video data, sensor data and/or other data provided by one or more recording devices into one or more actions for the electronic document 112. In one example, the artificial intelligence component 402 can employ a probabilistic or statistical-based analysis to learn or generate inferences with respect to audio data, image data, video data, sensor data and/or other data provided by one or more recording devices. In another aspect, the artificial intelligence component 402 can include an inference component (not shown) that can further enhance aspects of the artificial intelligence component 402 utilizing in part inference-based schemes to facilitate mapping audio data, image data, video data, sensor data and/or other data provided by one or more recording devices into one or more actions for the electronic document 112.

The artificial intelligence component 402 can employ any suitable machine-learning based techniques, statistical-based techniques and/or probabilistic-based techniques for the speech recognition process and/or the gesture recognition process. For example, the artificial intelligence component 402 can employ expert systems, fuzzy logic, SVMs, HMMs, greedy search algorithms, rule-based systems, Bayesian models (e.g., Bayesian networks), neural networks, other non-linear training techniques, data fusion, utility-based analytical systems, systems employing Bayesian models, etc. In another aspect, the artificial intelligence component 402 can perform a set of machine learning computations associated with speech recognition and/or gesture recognition of audio data, image data, video data, sensor data and/or other data provided by one or more recording devices. For example, the artificial intelligence component 402 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, or a set of different machine learning computations associated with mapping audio data, image data, video data, sensor data and/or other data provided by one or more recording devices into one or more actions for the electronic document 112 using one or more speech recognitions and/or one or more gesture recognitions techniques.

Figure 5:
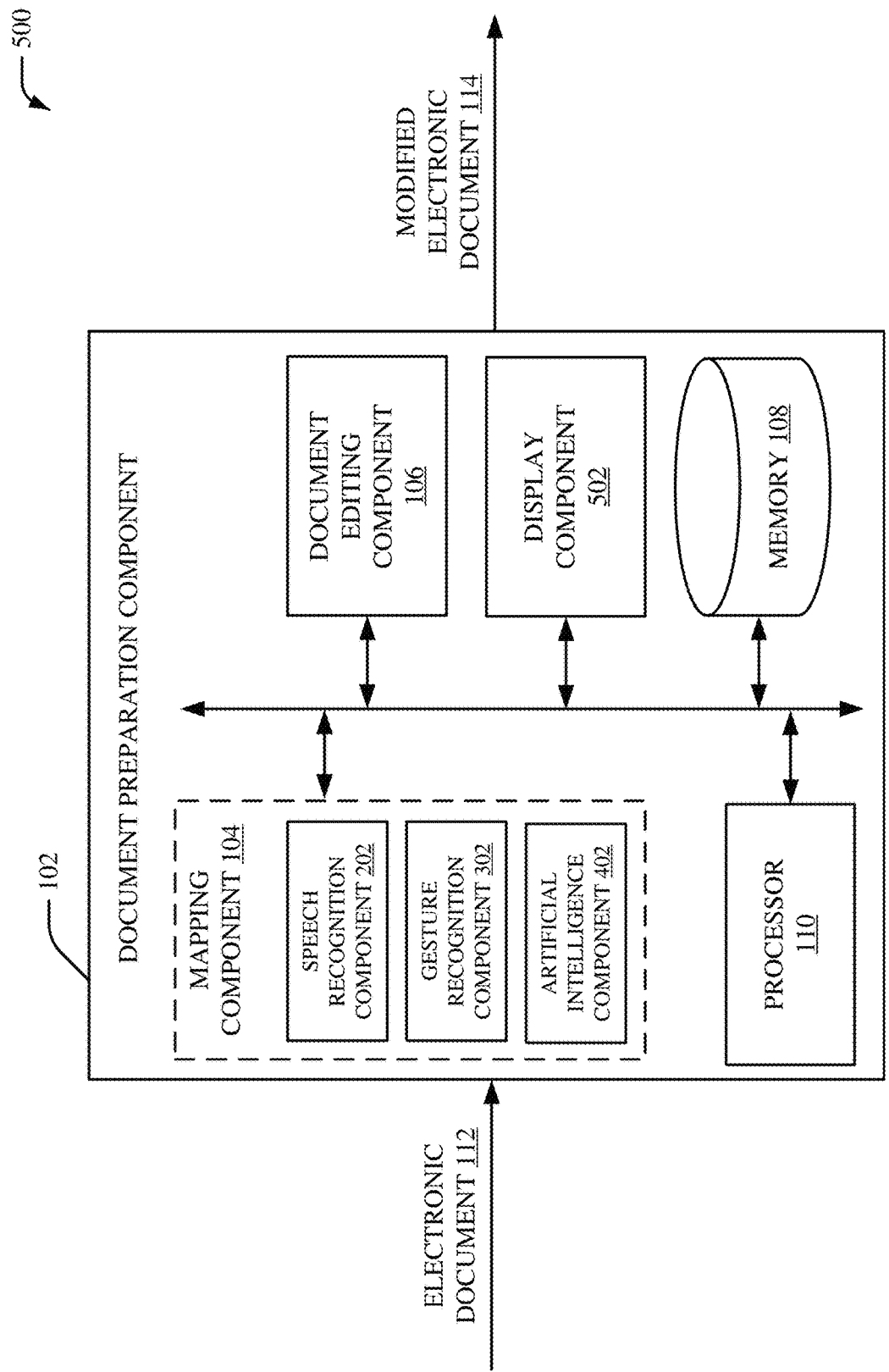
FIG. 5 illustrates a block diagram of yet another example, non-limiting system that includes a document preparation component in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes the document preparation component 102. The document preparation component 102 can include the mapping component 104, the document editing component 106, the memory 108, the processor 110, and/or a display component 502. In the embodiment shown in FIG. 5, the mapping component 104 can include the speech recognition component 202, the gesture recognition component 302 and/or the artificial intelligence component 402. The display component 502 can output the modified electronic document 114 to a display device that includes a display. For example, the display of the display device can present the modified electronic document 114 in a human-interpretable format. The display device can be a screen, a monitor, a projector wall, an electronic device, a desktop computer, a laptop computer, a smart device, a smart phone, a mobile device, a handheld device, a tablet device, a virtual reality device, a portable computing device, or another display device associated with a display configured to present the modified electronic document 114. The display component 502 can, for example, render the modified electronic document 114 on a user interface associated with the display device. In an aspect, the display component 502 can alter visual characteristics (e.g., content, arrangement, visual properties, size, hues, shading, etc.) of at least a portion of the modified electronic document 114 in response to data (e.g., data associated with one or more actions) provided by one or more recording devices. In another aspect, the display component 502 can allow a user to navigate through the modified electronic document 114 (e.g., alter a view associated with the modified electronic document 114, zoom into or out with respect to the modified electronic document 114, etc.) via the display device. As such, a user can view and/or interact with the modified electronic document 114 via the display device.

Figure 6:
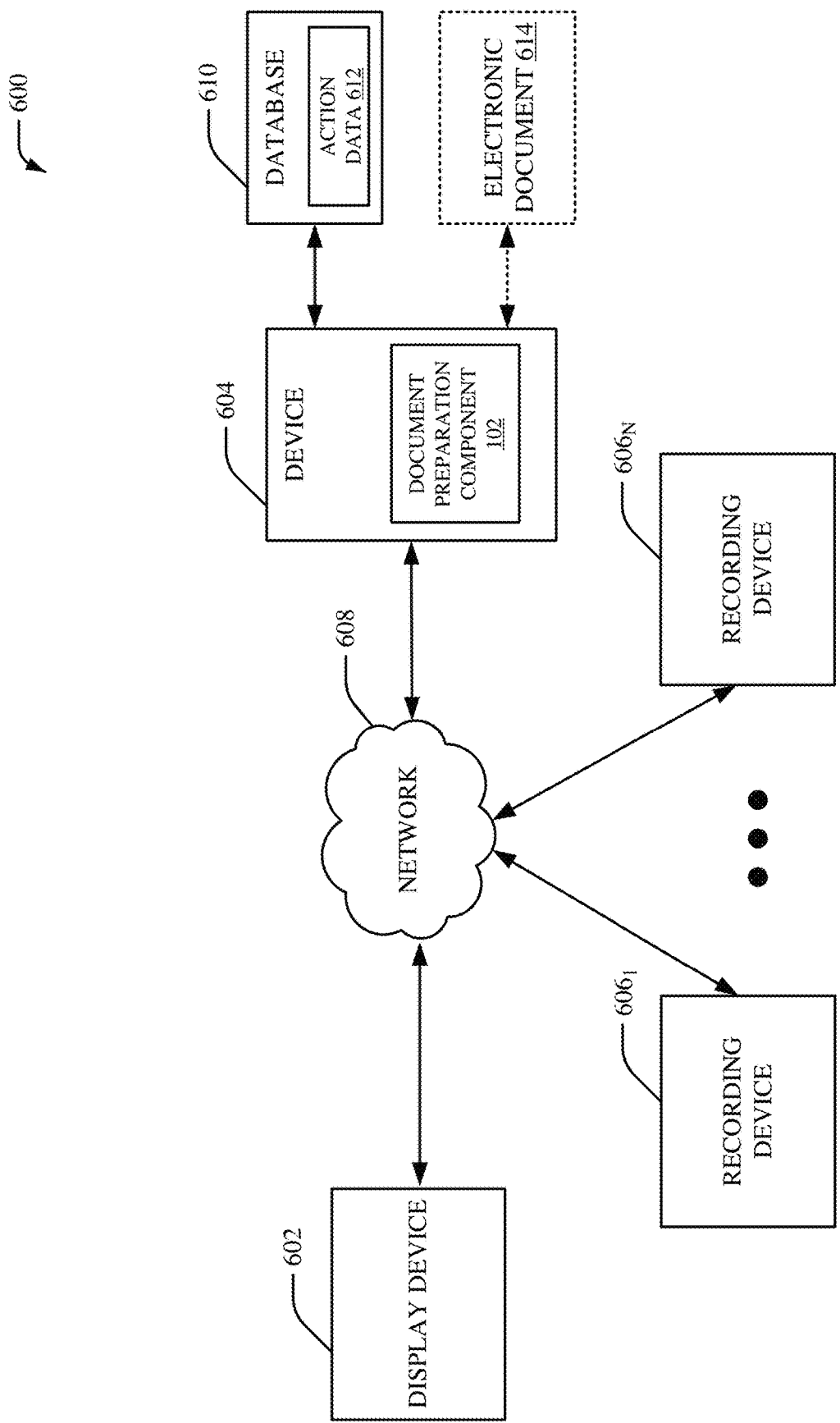
FIG. 6 illustrates an example, non-limiting system for facilitating artificial intelligence for interactive preparation of electronic documents in accordance with one or more embodiments described herein.

FIG. 6 illustrates an example, non-limiting system 600 in accordance with one or more embodiments described herein. Repetitive description of like elements employed in other embodiments described herein is omitted for sake of brevity.

The system 600 includes a display device 602, a device 604 and/or one or more recording devices $606_{1-N}$, where N is an integer. In an embodiment, the system 600 can be a network environment (e.g., a computing network). For instance, the system 600 can be a cloud computing environment. The display device 602 can be configured to display the electronic document 112 and/or the modified electronic document 114. The display device 602 can be, for example, a screen, a monitor, a projector wall, an electronic device, a desktop computer, a laptop computer, a smart device, a smart phone, a mobile device, a handheld device, a tablet device, a virtual reality device, a portable computing device, or another display device associated with a display configured to present the electronic document 112 and/or the modified electronic document 114. In certain embodiments, the display device 602 can include one or more display devices. The device 604 can include the document preparation component 102. In an embodiment, the device 604 can be a server. In another embodiment, the device 604 can be an electronic device such as, for example, a desktop computer, a laptop computer, a smart device, a smart phone, a mobile device, a handheld device, a tablet device, a virtual reality device, a portable computing device, or another type of electronic device. However, it is to be appreciated that, in certain embodiments, the device 604 can be a different type of device. The document preparation component 102 can include the mapping component 104, the document editing component 106, the speech recognition component 202, the gesture recognition component 302, the artificial intelligence component 402, the display component 502, the memory 108, and/or the processor 110. Additionally, in certain embodiments, the device 604 can include an input/output controller and/or a communication interface to facilitate communication with the display device 602 and/or the one or more recording devices $606_{1-N}$. The one or more recording devices $606_{1-N}$ can include one or more microphones, one or more cameras, one or more sensors, and/or one or more other recording devices. In an embodiment, the document preparation component 102 of the device 604 can be communicatively coupled to the display device 602 and/or the one or more recording devices $606_{1-N}$ via a network 608. The network 608 can be a communication network, a wireless network, a wired network, an internet protocol (IP) network, a voice over IP network, an internet telephony network, a mobile telecommunications network or another type of network.

In an embodiment, the device 604 can include and/or can be communicatively coupled to a database 610. The database 610 can store action data 612. The action data 612 can include data for a set of gestures and a corresponding action for one or more gestures included in the set of gestures. Additionally or alternatively, the action data 612 can include data for a set of phrases and a corresponding action for one or more phrases included in the set of phrases. In an aspect, the action data 612 can include a set of actions associated with the set of gestures and/or the set of phrases. For instance, the action data 612 can include a set of editing actions associated with the set of gestures and/or the set of phrases. The action data 612 can additionally or alternatively include a set of navigation actions associated with the set of gestures and/or the set of phrases. In an aspect, the device 604 (e.g., the mapping component 104 of the document preparation component 102) can compare data provided by the one or more recording devices $606_{1-N}$ to the set of actions included in the action data 612. For example, the device 604 (e.g., the mapping component 104 of the document preparation component 102) can compare data provided by the one or more recording devices $606_{1-N}$ to the set of editing actions and/or the set of navigation actions included in the action data 612. The device 604 (e.g., the mapping component 104 of the document preparation component 102) can also select an action from the action data 612 for an electronic document displayed via the display device 602. For example, the device 604 (e.g., the mapping component 104 of the document preparation component 102) can also select an editing action and/or a navigation action from the action data 612 for an electronic document 614. The electronic document 614 can be a digital document that is generated and/or managed by the device 604 (e.g., by the document preparation component 102). The electronic document 614 can include electronic content such as electronic textual content, electronic media content, graphical content and/or other content. For example, the electronic document 614 can include text, one or more charts, one or more images, one or more links, one or more tables, one or more animations, one or more videos and/or other content. In an embodiment, the electronic document 614 can be displayed via the display device 602. In another embodiment, device 604 (e.g., the document editing component 106 of the document preparation component 102) can apply an action included the action data 612 (e.g., an associated with a recording device from the one or more recording devices $606_{1-N}$) to the electronic document to generate a modified version of the electronic document 614. As such, in certain embodiments, a modified version of the electronic document 614 can be displayed via the display device 602.

Figure 7:
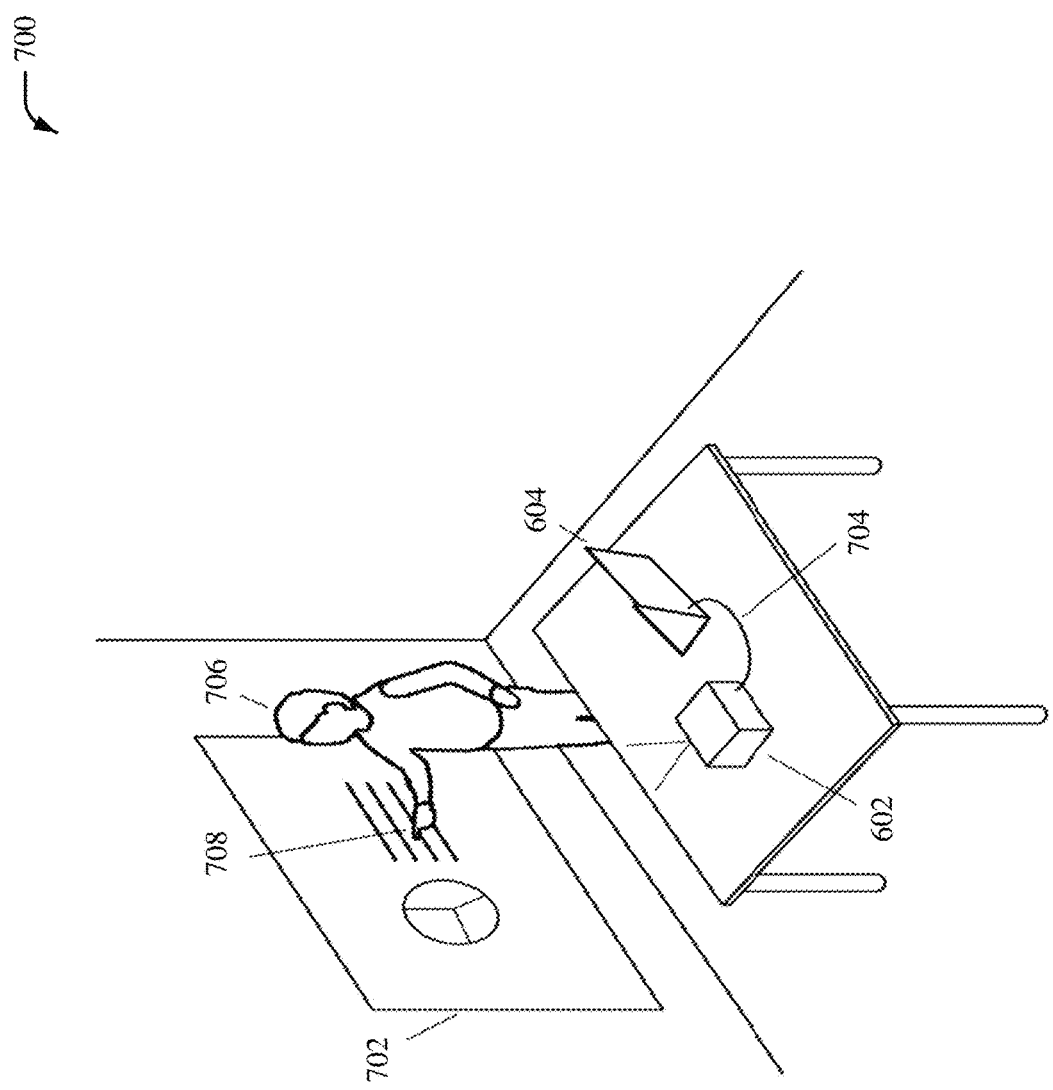
FIG. 7 illustrates another example, non-limiting system for facilitating artificial intelligence for interactive preparation of electronic documents in accordance with one or more embodiments described herein.

FIG. 7 illustrates an example, non-limiting system 700 in accordance with one or more embodiments described herein. Repetitive description of like elements employed in other embodiments described herein is omitted for sake of brevity.

The system 700 includes the display device 602 and the device 604. The document preparation component 102 can include the mapping component 104, the document editing component 106, the speech recognition component 202, the gesture recognition component 302, the artificial intelligence component 402, the display component 502, the memory 108, and/or the processor 110. In an embodiment, the device 604 can include the one or more recording devices $606_{1-N}$. In another embodiment, the one or more recording devices $606_{1-N}$ can be separate from the device 604. In an embodiment shown in FIG. 7, the display device 602 can provide a projected electronic document 702. For instance, the projected electronic document 702 can be a projected version of the electronic document 614, the electronic document 112 and/or the modified electronic document 114. In an example, the display device 602 can be a projector that projects the projected electronic document 702 onto a screen. In certain embodiments, the display device 602 can be communicatively coupled to the device 604 via a connection 704 associated with the network 608. The connection 704 can be a wired connection and/or a wireless connection. Additionally, in an example, a user 706 can perform an action 708 to modify one or more portions associated with the projected electronic document 702. For instance, the action 708 performed by the user 706 can be an editing action or a navigation action. In one example, the action 708 performed by the user 706 can be a non-verbal gesture associated with a cut action, a move action, a copy action, an insert action, a format action, an undo action, and/or another type of action associated with the projected electronic document 702. In certain embodiments, the user 706 can additionally or alternatively provide verbal communication (e.g., speech) to modify one or more portions associated with the projected electronic document 702. In a non-limiting example, video and/or audio of verbal instructions associated with the user 706 and/or regarding the projected electronic document 702 can be combined with non-verbal gestures performed by the user 706. The verbal instructions and/or the non-verbal gestures can be associated with edits and/or navigation for the projected electronic document 702. For instance, the user 706 can state "add the phrase X here" while pointing their hand at a targeted location in the projected electronic document 702. In another example, the user 706 can provide verbal instructions such as, for example, "correct this typo", "move that figure to the second listed item", "create a chart from data in a file or another data source", etc.

Figure 8:
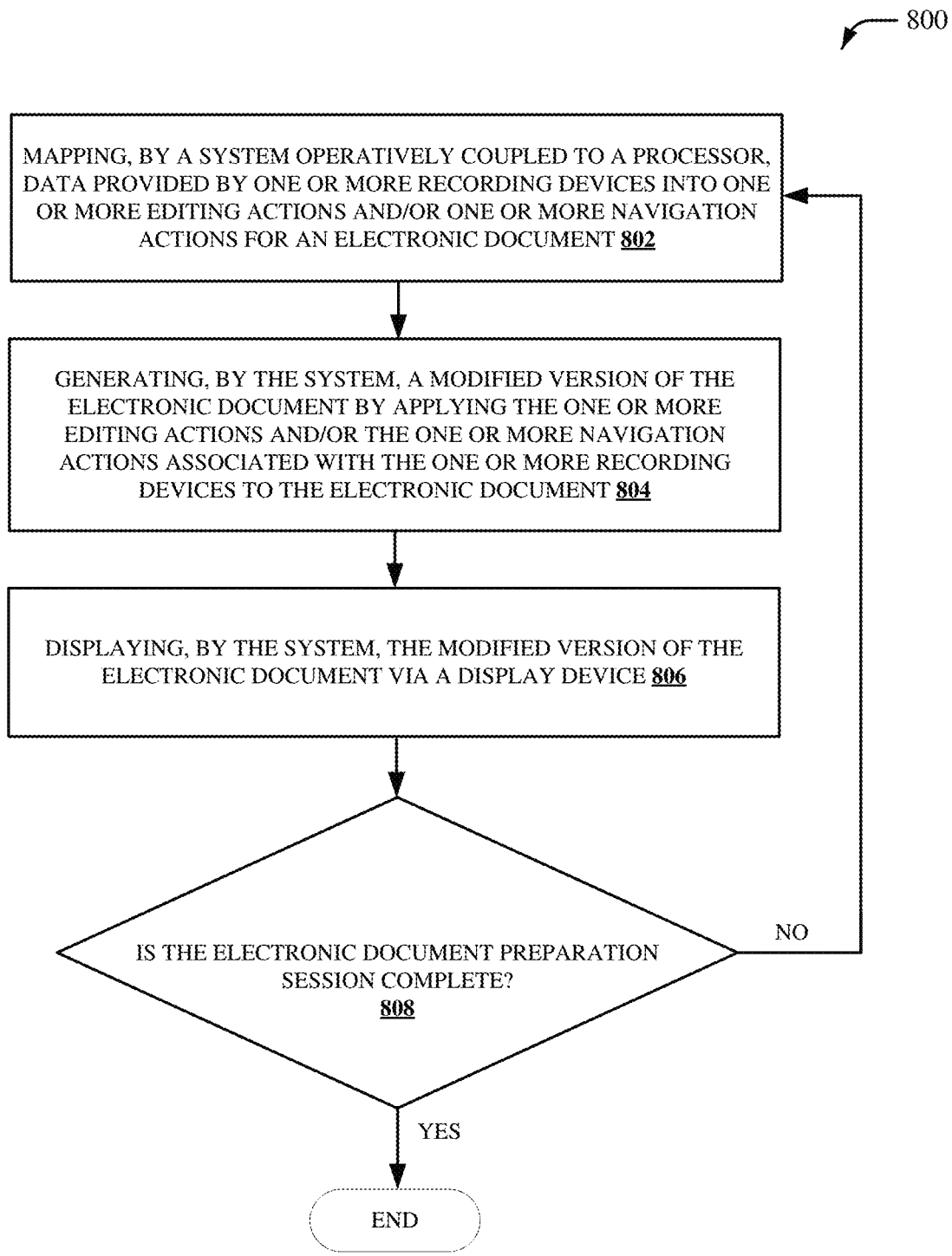
FIG. 8 illustrates a flow diagram of an example, non-limiting computer-implemented method for facilitating artificial intelligence for interactive preparation of electronic documents in accordance with one or more embodiments described herein.

FIG. 8 illustrates a flow diagram of an example, non-limiting computer-implemented method 800 for facilitating artificial intelligence for interactive preparation of electronic documents in accordance with one or more embodiments described herein. At 802, data provided by one or more recording devices is mapped, by a system operatively coupled to a processor (e.g., by mapping component 104), into one or more editing actions and/or one or more navigation actions for an electronic document. The one or more recording devices can include one or more microphones, one or more cameras, one or more sensors, and/or one or more other recording devices. For example, a microphone included in the one or more recording devices can capture and/or record audio data. In another example, a camera from the one or more recording devices can capture and/or record image data and/or video data. In yet another example, a sensor from the one or more recording devices can capture and/or record sensor data associated with audio data, image data, video data, and/or other data. The electronic document can be a digital document that is generated and/or managed by a computer (e.g., a computing device). The electronic document can include electronic content such as electronic textual content, electronic media content, graphical content and/or other content. For example, the electronic document can include text, one or more charts, one or more images, one or more links, one or more tables, one or more animations, one or more videos and/or other content. An editing action can be, for example, an action to add content to the electronic document, an action to modify content in the electronic document, an action to format content in the electronic document, an action to remove content from the electronic document, an action to insert content to the electronic document, an action to move content in the electronic document, and/or another type of action to edit the electronic document. A navigation action can be, for example, an action to modify (e.g., alter) a view of the electronic document, an action to change a viewing location within the electronic document, and/or another type of action to navigate within the electronic document. In certain embodiments, data provided by the one or more recording devices can be mapped into the one or more editing actions and/or the one or more navigation actions for the electronic document based on an artificial intelligence process and/or one or more artificial intelligence techniques. In certain embodiments, a speech recognition process can be performed to map audio data, video data and/or sensor provided by the one or more recording devices into the one or more editing actions and/or the one or more navigation actions for the electronic document. In certain embodiments, a gesture recognition process can additionally or alternatively be performed to map image data, video data and/or sensor provided by the one or more recording devices into the one or more editing actions and/or the one or more navigation actions for the electronic document.

At 804, a modified version of the electronic document is generated, by the system (e.g., by document editing component 106), by applying the one or more editing actions and/or the one or more navigation actions associated with the one or more recording devices to the electronic document. For instance, in response to the one or more editing actions and/or the one or more navigation actions being applied to the electronic document, the electronic document can be transformed into the modified version of the electronic document. In an aspect, the one or more editing actions and/or the one or more navigation actions can be applied to the electronic document to generate the modified version of the electronic document. In certain embodiments, the modified version of the electronic document can be generated to provide an improved version of the electronic document.

At 806, the modified version of the electronic document is displayed, by the system (e.g., by display component 502), via a display device. The display device can be a screen, a monitor, a projector wall, an electronic device, a desktop computer, a laptop computer, a smart device, a smart phone, a mobile device, a handheld device, a tablet device, a virtual reality device, a portable computing device, or another display device associated with a display configured to present the modified version of the electronic document. In an aspect, visual characteristics (e.g., content, arrangement, color, size, hues, shading, etc.) of at least a portion of the modified version of the electronic document displayed via the display device can be altered based on the one or more editing actions and/or the one or more navigation actions.

At 808, it is determined whether the electronic document preparation process is complete. For example, it can be determined whether the electronic document is sufficiently updated. If no, the computer-implemented method 800 returns to 802. If yes, the computer-implemented method 800 ends.

Figure 9:
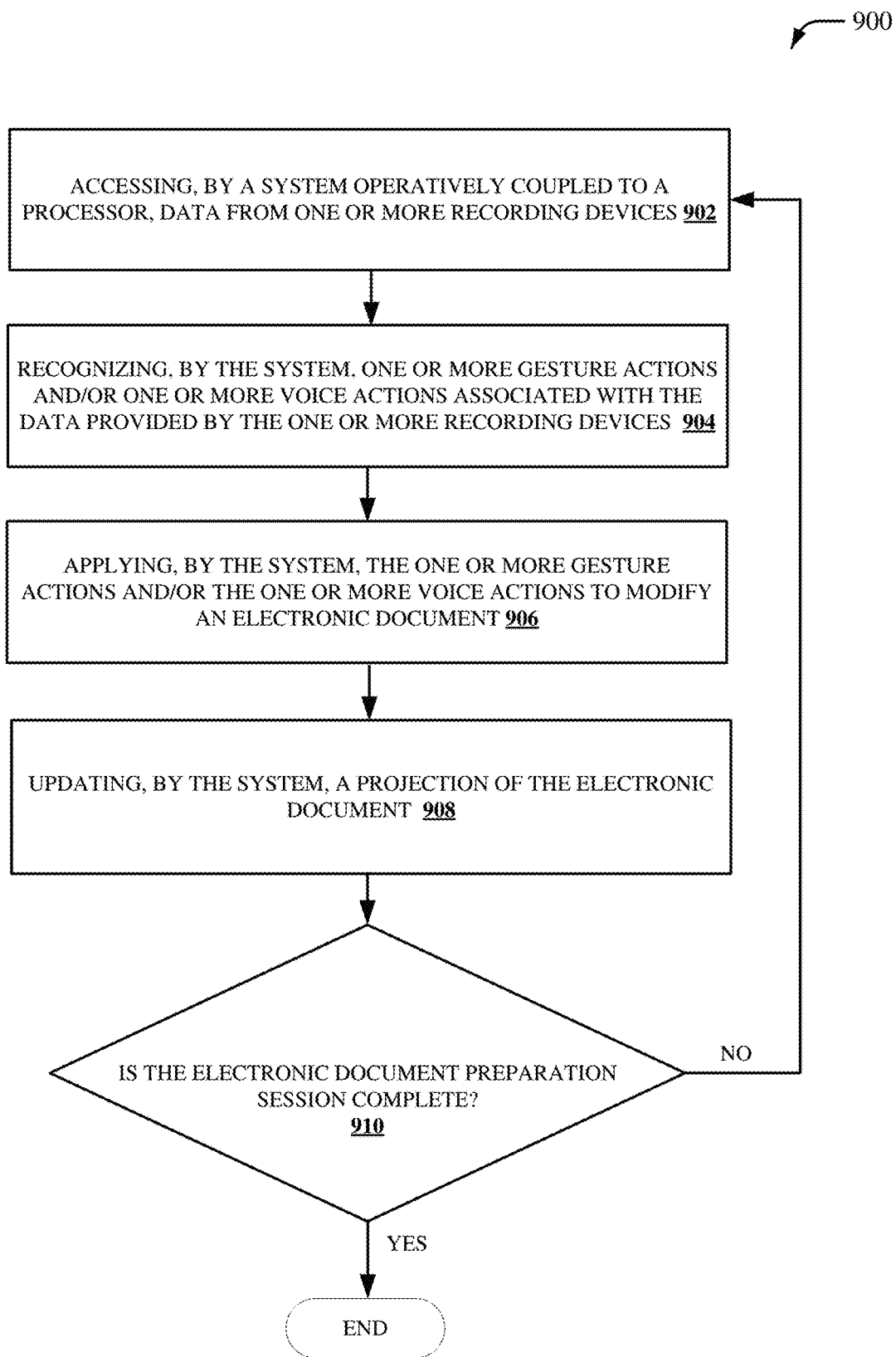
FIG. 9 illustrates a flow diagram of another example, non-limiting computer-implemented method for facilitating artificial intelligence for interactive preparation of electronic documents in accordance with one or more embodiments described herein.

FIG. 9 illustrates a flow diagram of an example, non-limiting computer-implemented method 900 for facilitating artificial intelligence for interactive preparation of electronic documents in accordance with one or more embodiments described herein. At 902, data from one or more recording devices is accessed, by a system operatively coupled to a processor (e.g., by mapping component 104). At 904, one or more gesture actions and/or one or more voice actions associated with the data provided by the one or more recording devices is recognized by the system (e.g., by mapping component 104). At 906, the one or more gesture actions and/or the one or more voice actions is applied, by the system (e.g., by document editing component 106), to modify an electronic document. At 908, a projection of the electronic document is updated by the system (e.g., by document editing component 106 and/or display component 502). At 910, it is determined whether the electronic document preparation process is complete. For example, it can be determined whether the electronic document is sufficiently updated. If no, the computer-implemented method 900 returns to 902. If yes, the computer-implemented method 900 ends.

For simplicity of explanation, the computer-implemented methodologies are depicted and described as a series of acts. It is to be understood and appreciated that the subject innovation is not limited by the acts illustrated or by the order of acts, for example acts can occur in various orders or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least mapping data provided by one or more recording devices into one or more actions (e.g., one or more editing actions, one or more navigation actions, one or more gesture actions and/or one or more voice actions) for an electronic document, etc. are established from a combination of electrical and mechanical components and circuitry, a human is unable to replicate or perform an electronic document preparation process performed by the document preparation component 102 (e.g., the mapping component 104, the document editing component 106, the speech recognition component 202, the gesture recognition component 302, the artificial intelligence component 402, and/or the display component 502) disclosed herein. For example, a human is unable to monitor one or more resources in a computing network, etc.

Figure 10:
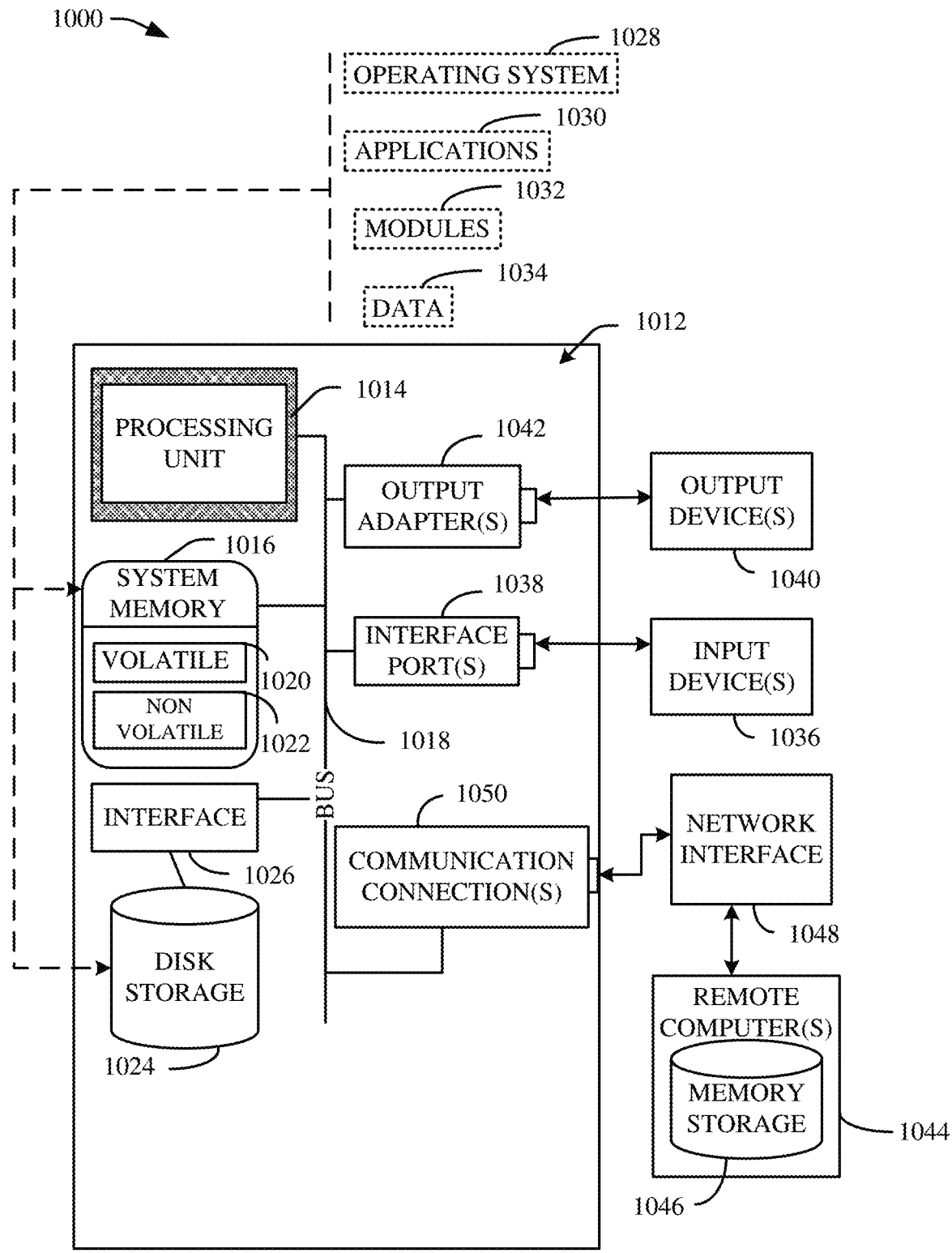
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
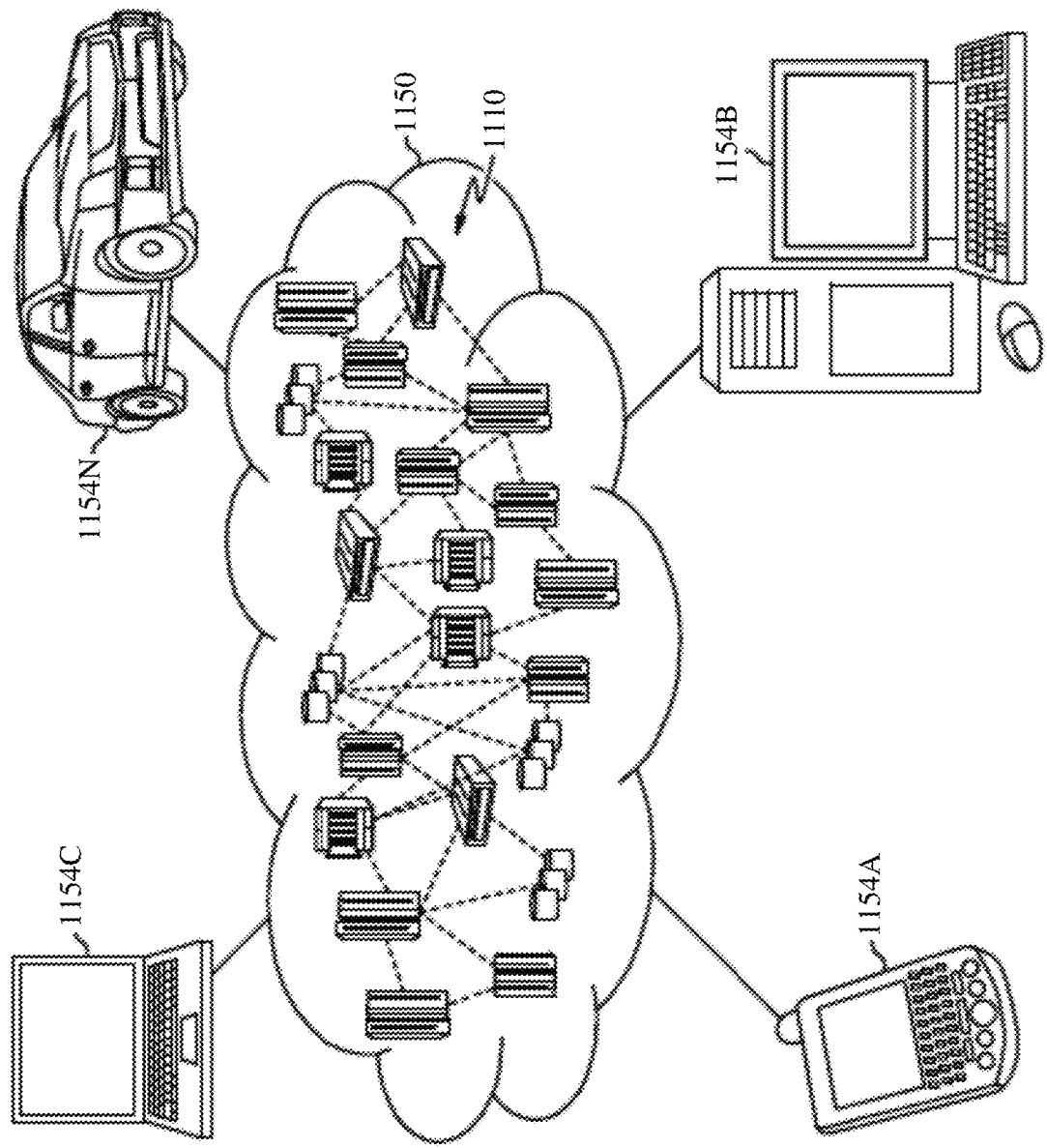
FIG. 11 illustrates a block diagram of an example, non-limiting cloud computing environment in accordance with one or more embodiments of the present invention.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network or network addressable connection (e.g., using a web browser).

Figure 12:
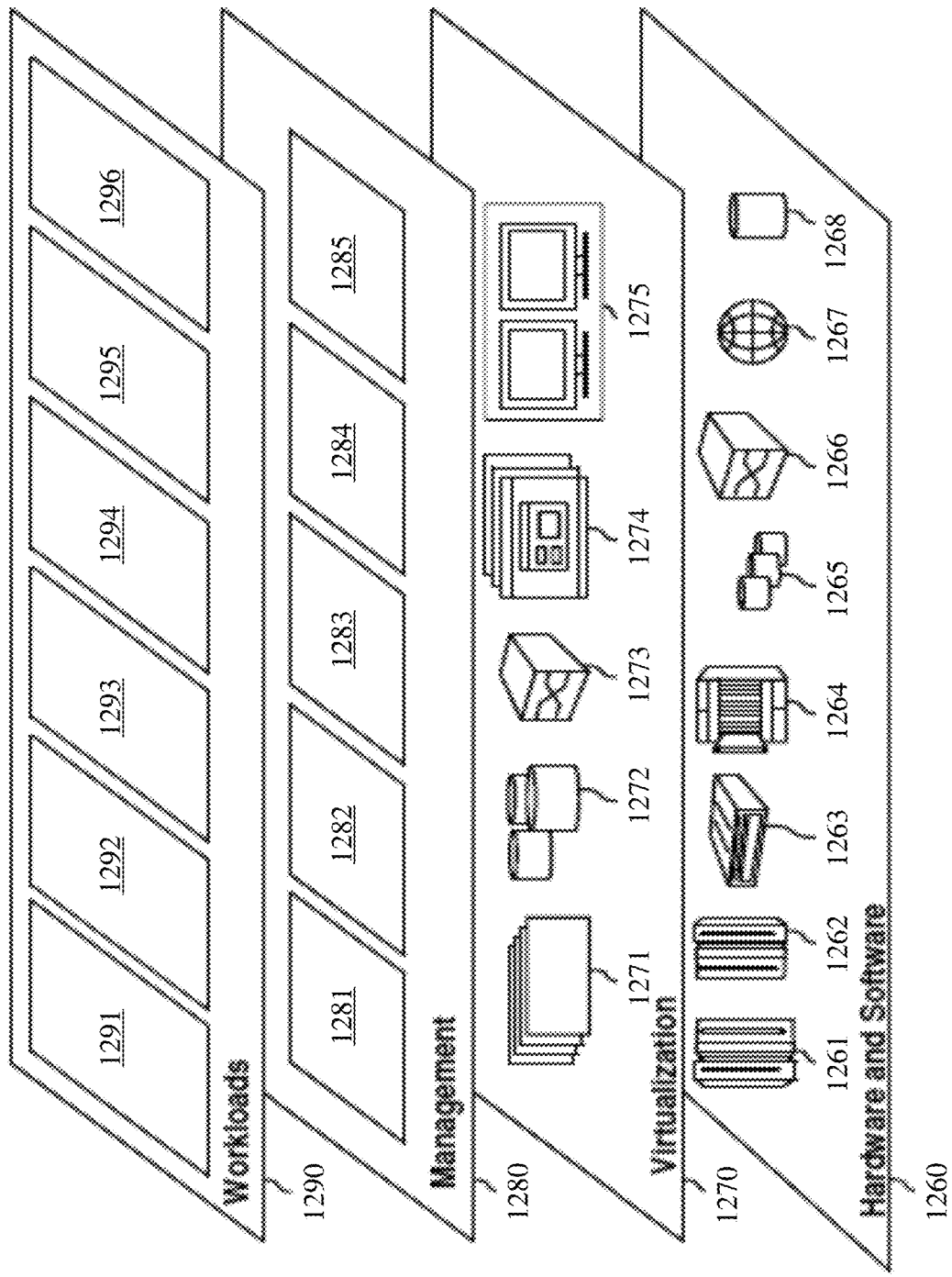
FIG. 12 illustrates a block diagram of example, non-limiting abstraction model layers in accordance with one or more embodiments of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263;

blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and electronic document preparation process software 1296.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a mapping component that maps data provided by at least one recording device into an editing action for an electronic document, wherein the data comprises first data associated with a first user identity and second data associated with a second user identity, the first data and the second data are captured concurrently, and the mapping component maps the first data into a user-initiated voice-based editing action associated with the electronic document, and maps the second data into a user-initiated gesture-based editing action associated with the electronic document; and
a document editing component that:
determines, using an artificial intelligence technique, whether a first version of the electronic document generating using the user-initiated voice-based editing action or a second version of the electronic document generating using the user-initiated gesture-based editing action provides an optimal version of the electronic document with respect to reduction of errors in the electronic document,
in response to determining that the first version of the electronic document provides the optimal version of the electronic document, selects the user-initiated voice-based editing action as the editing action,
in response to determining that the second version of the electronic document provides the optimal version of the electronic document, selects the user-initiated gesture-based editing action as the editing action, and
applies the editing action to the electronic document to generate a modified version of the electronic document.

2. The system of claim 1, wherein the mapping component analyzes the data provided by the at least one recording device based on the one or more artificial intelligence techniques.

3. The system of claim 1, wherein the mapping component compares the data to a set of editing actions and selects the user-initiated voice-based editing action and the user-initiated gesture-based editing action from the set of editing actions.

4. The system of claim 1, wherein the mapping component maps third data provided by the at least one recording device into a navigation action associated with the electronic document.

5. The system of claim 4, wherein the document editing component applies the navigation action to the electronic document to modify a view associated with the electronic document.

6. The system of claim 1, wherein the editing action edits content in the electronic document selected from a group consisting of text, a chart, an image, a link, a table, an animation, and a video.

7. The system of claim 1, wherein the system is a cloud computing system.

8. The system of claim 1, wherein the data comprises audio data, and wherein the computer executable components further comprise:
a speech recognition component that receives the audio data from a microphone device and performs a speech recognition process to map the audio data into the user-initiated voice-based editing action.

9. The system of claim 1, wherein the data comprises image data, and wherein the computer executable components further comprise:
a gesture recognition component that receives the image data from a camera device and performs a gesture recognition process to map the image data into the user-initiated gesture-based editing action.

10. The system of claim 9, wherein the gesture recognition component interprets a gesture action associated with a visual representation of the electronic document on a display.

11. The system of claim 1, wherein the computer executable components further comprise:
a display component that outputs the modified version of the electronic document to a display.

12. The system of claim 1, wherein the at least one recording device comprises a first recording device associated with the first user identity and a second recording device associated with the second user identity.

13. A computer-implemented method, comprising:
mapping, by a system operatively coupled to a processor, data provided by at least one recording device into an editing action for an electronic document, wherein the data comprises first data associated with a first user identity and second data associated with a second user identity, the first data and the second data are captured concurrently, and the mapping comprises:
mapping the first data into a user-initiated voice-based editing action associated with the electronic document,
mapping the second data into a user-initiated gesture-based editing action associated with the electronic document,
determining whether a first version of the electronic document generating using the user-initiated voice-based editing action or a second version of the electronic document generating using the user-initiated gesture-based editing action provides an optimal version of the electronic document with respect to reduction of errors in the electronic document;
in response to determining that the first version of the electronic document provides the optimal version of the electronic document, selecting the user-initiated voice-based editing action as the editing action, and
in response to determining that the second version of the electronic document provides the optimal version of the electronic document, selecting the user-initiated gesture-based editing action as the editing action; and
generating, by the system, a modified version of the electronic document by applying the editing action to the electronic document.

14. The computer-implemented method of claim 13, wherein the editing action edits content in the electronic document selected from a group consisting of text, a chart, an image, a link, a table, an animation, and a video.

15. The computer-implemented method of claim 13, wherein the mapping comprises performing a speech recognition process to map audio data provided by the at least one recording device into the user-initiated voice-based editing action.

16. The computer-implemented method of claim 13, wherein the mapping comprises performing a gesture recognition process to map image data provided by the at least one recording device into the second user-initiated editing action.

17. The computer-implemented method of claim 13, wherein the system is a cloud computing system.

18. A computer program product for facilitating electronic document preparation, the computer program product comprising a computer readable storage medium having program instructions embodied therewith, the program instructions executable by a processor to cause the processor to:
map, by the processor, data provided by at least one recording device into an editing action for an electronic document, wherein the data comprises first data associated with a first user identity and second data associated with a second user entity, the first data and the second data are captured concurrently, and the mapping comprises:
map, by the processor, the first data into a user-initiated voice-based editing action associated with the electronic document,
map, by the processor, the second data into a second user-initiated editing action associated with the electronic document, and
determine, by the processor, whether a first version of the electronic document generating using the user-initiated voice-based editing action or a second version of the electronic document generating using the user-initiated gesture-based editing action provides an optimal version of the electronic document with respect to reduction of errors in the electronic document,
in response to determining that the first version of the electronic document provides the optimal version of the electronic document, select, by the processor, the user-initiated voice-based editing action as the editing action;
in response to determining that the second version of the electronic document provides the optimal version of the electronic document, select, by the processor, the user-initiated gesture-based editing action as the editing action;
apply, by the processor, the editing action to the electronic document to generate a modified version of the electronic document; and
display, by the processor, the modified version of the electronic document via a display device.

19. The computer program product of claim 18, wherein the program instructions are further executable by the processor to cause the processor to:
perform, by the processor, a speech recognition process to map audio data provided by the at least one recording device into the user-initiated voice-based editing action.

20. The computer program product of claim 18, wherein the program instructions are further executable by the processor to cause the processor to:
perform, by the processor, a gesture recognition process to map video data provided by the at least one recording device into the user-initiated gesture-based editing action.

* * * * *